(12) United States Patent
Lolli et al.

(10) Patent No.: US 8,631,840 B2
(45) Date of Patent: Jan. 21, 2014

(54) KIT FOR REPAIRING AND INFLATING INFLATABLE ITEMS

(75) Inventors: Sergio Lolli, Pesaro (IT); Wenhao Chen, Pesaro (IT)

(73) Assignee: Tek Global S.r.l., Pesaro (IT)

( * ) Notice: Subject to any disclaimer, the term of this patent is extended or adjusted under 35 U.S.C. 154(b) by 0 days.

(21) Appl. No.: 13/638,030

(22) PCT Filed: Apr. 7, 2011

(86) PCT No.: PCT/IB2011/000759
§ 371 (c)(1),
(2), (4) Date: Jan. 8, 2013

(87) PCT Pub. No.: WO2011/124977
PCT Pub. Date: Oct. 13, 2011

(65) Prior Publication Data
US 2013/0199665 A1 Aug. 8, 2013

(30) Foreign Application Priority Data
Apr. 7, 2010 (IT) .............................. TO2010A0264

(51) Int. Cl.
*B65B 1/04* (2006.01)
(52) U.S. Cl.
USPC ............. 141/302; 141/38; 141/104; 141/114; 141/313; 141/351

(58) Field of Classification Search
USPC ............ 141/38, 67, 100, 104, 114, 231, 313, 141/310, 302, 351
See application file for complete search history.

(56) References Cited

U.S. PATENT DOCUMENTS 6,736,170 B2 * 5/2004 Eriksen et al. ................... 141/38
8,505,591 B2 * 8/2013 Eckhardt ......................... 141/38

* cited by examiner

*Primary Examiner* — Jason K Niesz
(74) *Attorney, Agent, or Firm* — Ladas & Parry LLP

(57) ABSTRACT

A kit for repairing and inflating inflatable items comprises a housing, a compressor assembly housed within the housing, a connecting device having an inlet connected to the compressor assembly and a seat adapted to be fluidically connected to a container assembly for a sealing liquid and to the inlet, a valve configured to be opened automatically when the container assembly is connected to the connection device and elastically maintained in a first position such as to fluidically disconnect the inlet from the seat when the container assembly is disconnected from the connecting device, and a flexible tube fluidically connected to the compressor assembly. In particular, the connecting device comprises an outlet fluidically connected to the valve so as to be fluidically connected to the inlet when the valve is in the first position, and in that the flexible tube is connected to the outlet.

8 Claims, 3 Drawing Sheets

KIT FOR REPAIRING AND INFLATING INFLATABLE ITEMS

RELATED APPLICATION INFORMATION

This application is a 371 of International Application PCT/IB2011/000759 filed 07 Apr. 2011 entitled "Kit for Repairing and Inflating Inflatable Items", which was published in the English language on 13 Oct. 2011, with International Publication Number WO 2011/124977 A1, and which claims priority from Italian Patent Application No. TO2010A000264 filed on 07 Apr. 2010, the content of which is incorporated herein by reference.

TECHNICAL FIELD

The present invention relates to a kit for inflating and repairing inflatable items, in particular tyres.

BACKGROUND ART

Kits are known for repairing and inflating tyres comprising an electrically actuated compressor assembly and a container for a sealing liquid which is injected when required in the tyre by means of a pressurised air flow coming from the compressor assembly through a fluidic line.

WO-A1-08035163 to the same applicant, discloses a kit in which the compressor assembly is housed within a housing and, when required, the sealing liquid container is connected by a user to an opening of the housing so as to determine a fluidic connection with the compressor.

The previously disclosed kit further comprises a flexible tube connected directly to the compressor and arranged in parallel to the connecting opening for the sealing liquid container. Furthermore, the kit comprises a system of check valves configured to automatically and alternatively select the compressed air path towards the sealing liquid container or towards the flexible tube.

DISCLOSURE OF INVENTION

It is the object of the present invention to provide a kit for inflating and repairing inflatable items having reduced production costs and having the previously disclosed functionality.

The object of the present invention is obtained by means of a kit for inflating and repairing inflatable items according to claim 1.

BRIEF DESCRIPTION OF THE DRAWINGS

For a better understanding of the present invention, a preferred embodiment thereof will now be disclosed by mere way of non-limitative example and with reference to the accompanying drawings, in which.

BEST MODE FOR CARRYING OUT THE INVENTION

Figure 1:
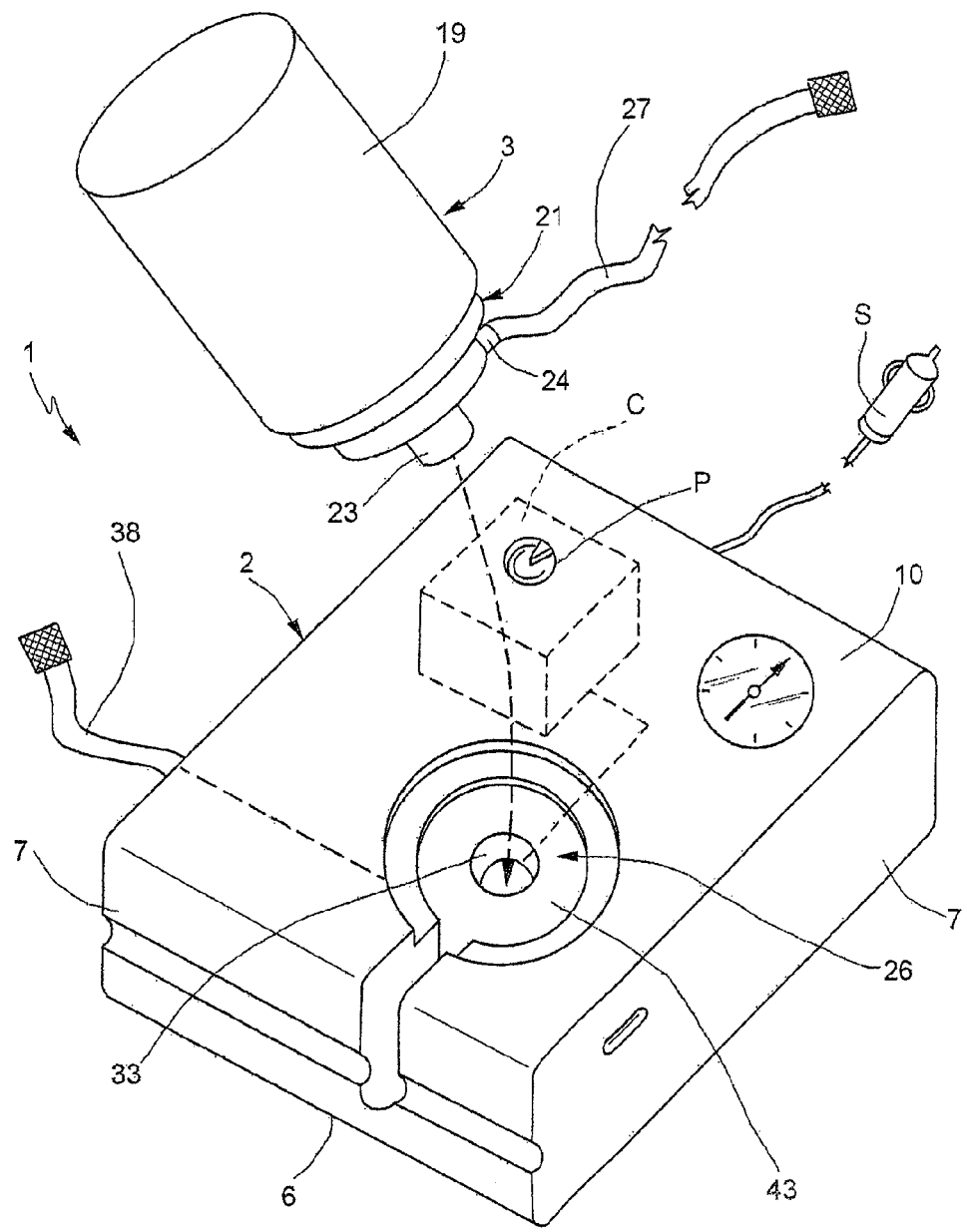
FIG. 1 is a perspective view of a kit for repairing and inflating inflatable items according to the present invention.

In FIG. 1 numeral 1 indicates a kit for repairing and inflating inflatable items, in particular tyres. Kit 1 comprises a housing 2, a compressor assembly C (shown schematically) which preferably consists of an electric motor actuatable by means of a plug S and an alternative compressor, and a container assembly 3 which is detachably connected to housing 2 and contains a sealing liquid of the known type.

In particular, housing 2 is substantially parallelepipedal and defines an inner chamber to house compressor assembly C. Housing 2 comprises a base wall 6, side walls 7 (only two of which are shown in FIG. 1), and a top wall 10 which is substantially parallel to the base wall 6.

Kit 1 further comprises a snapping connecting device 26 housed in housing 2 and cooperating with container assembly 3 as will be specified in greater detail hereinafter.

Container assembly 3 of kit 1 comprises a bottle 19 defining a chamber containing the sealing liquid, and a fluidic unit 21 preferably screwed to a threaded neck of bottle 19.

In particular, fluidic unit 21 defines an inlet opening 23 which may be connected to compressor assembly C and an outlet' opening 24 which may be connected in use to a tyre to be repaired by means of a flexible tube 27 connected to outlet opening 24.

Container assembly 3 further comprises a valve (not shown) interposed between inlet opening 23 and outlet opening 24 and configured to automatically open when a pressurised air flow passes through the inlet opening 23.

A valve according to patent application WO-A1-2005084968 filed by the same applicant is preferably used.

Container assembly 3 is connected fluidically and mechanically to housing 2 by means of connecting device 26 which is supported by base wall 6.

Connecting device 26 (FIG. 2) comprises a base 28 rigidly connected to housing 2 and a guide element 29 overlapped to base 28 and, in use, supporting container assembly 3 and in particular fluidic unit 21 of container 3 defining inlet opening 23 and outlet opening 24.

Base 28 defines a seat 33 which is open on the opposite side of base wall 6 and has an axis A perpendicular to base wall 6, and a duct 34 to fluidically connect seat 33 to compressor assembly C.

Snapping connecting device 26 further comprises a stop 35 which may slide in a direction perpendicular to axis A and is arranged in a housing defined by base 28.

In particular, stop 35 is a spring to maintain a predetermined closed position in which stop 35 avoids the extraction of container assembly 3 and in particular of distribution element 21.

According to the present invention, a valve 36 is arranged between duct 34 and an outlet duct 37 connected to a flexible tube 38 similar to tube 27 although connected to compressor C in parallel with respect to container assembly 3.

Figure 3:
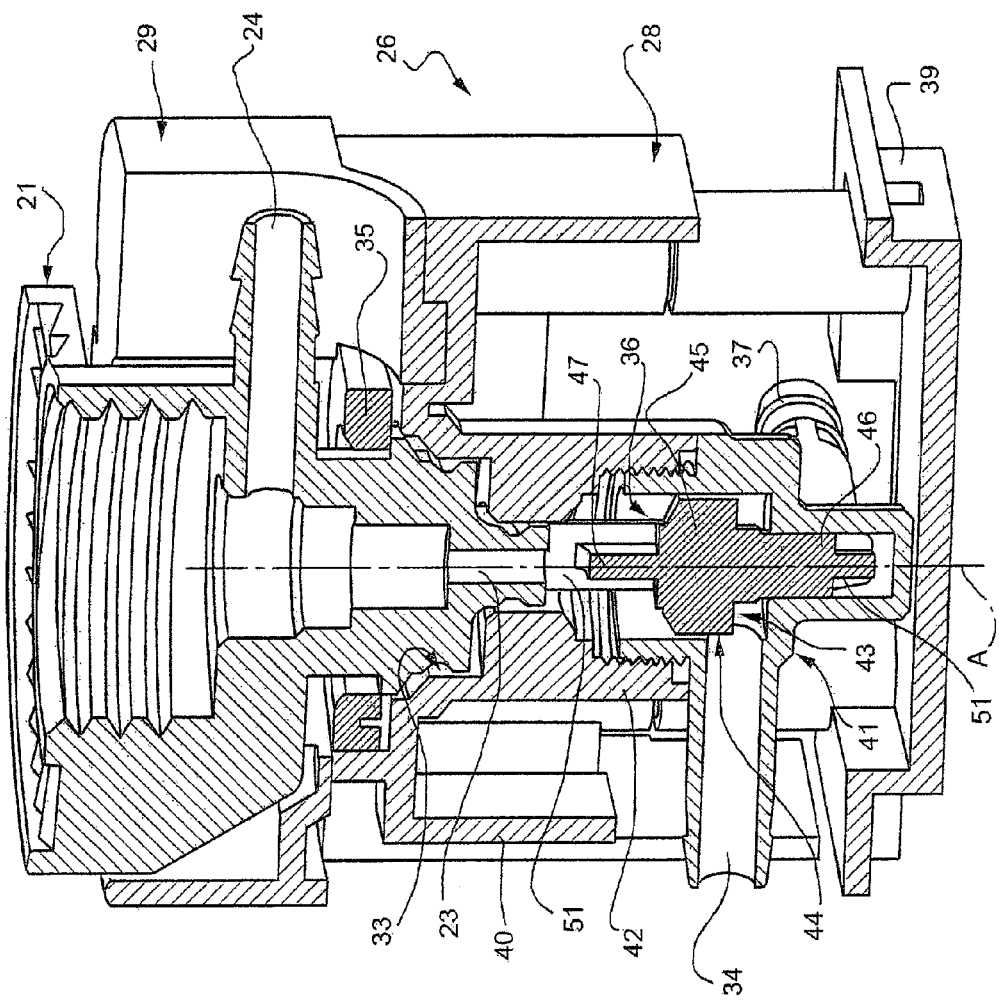
FIG. 3 is a section along a plane perpendicular to the section plane of FIG. 2 and in which the connecting component is in a second operating position.

In particular, base 28 comprises a support 39 which may be housed in an appropriate window of base wall 6 and is adapted to come into contact with the ground when kit 1 is used either to inflate or to repair a tyre, a profile portion 40 mounted on top of support 39 and defining seat 33, and a fluidic portion 41 defining ducts 34 and 37 and connected to seat 33. According to a preferred embodiment of the present invention, seat 33 is defined by the profiled portion 40 by means of a tubular wall 42 having an inner shaped profile preferably to approximate the profile of fluidic unit 21, in particular to approximate the profile of the portion arranged below the stop 35 as shown in FIG. 3. Preferably, fluidic portion 41 is connected to an end portion of tubular wall 42 so as to be suspended with respect to support 39. Fluidic portion 41 is connected to tubular wall 42 on the axially opposite part of the fluidic unit 21 and defines, with the first, a chamber 43 fluidically connected to seat 33 and to ducts 34 and 37.

Furthermore, chamber 43 houses a shutter 44 which is mobile along axis A and comprises a central body 45, a stem 46 and a stem 47 opposite with respect to central body 45. Shutter 44 is maintained in an end-stop position against an appropriate protrusion 49 of the tubular wall 42 by means of a spring 48 housed in chamber 43. In particular, stems 46, 47 have a predetermined length to control the air flow generated by compressor C.

Stem 46 is surrounded by spring 48 and, when central body 45 comes into contact with projection 49, has a shape such as to fluidically connect duct 34 with outlet duct 37 by means of chamber 43 while seat 33 is fluidically sealed.

Stem 47 has an axial extension such as to cause the detachment of central body 45 from projection 49 when container assembly 3 is connected to snapping connecting device 26 and stop 35 axially blocks fluidic unit 21. In particular, stems 46 and 47 have a size such that, in the position disclosed in the previous paragraph in which container 3 is connected to snapping connecting device 26, stem 46 closes outlet duct 37 while inlet opening 23 and duct 34 are fluidically connected by means of seat 33 and chamber 43.

According to a preferred embodiment of the present invention, the axial movement of shutter 44 is guided by the coupling between one of two stems 46, 47 and fluidic portion 41 or tubular wall 42 respectively. For example, fluidic portion 41 comprises a seat 50 coaxial to axis A and sized to house stem 46. Seat 50 is fluidically interposed between chamber 43 and outlet duct 37 and stem 46 engages seat 50 while stem 47 is still engaged and guided by tubular wall 42. Preferably, stem 47 may disengage from tubular wall 42 after stem 46 is engaged in and is guided by seat 50. In particular, stem 46 couples with seat 50 only after central body 45 has separated from projection 49 while container assembly 3 is connected to connecting device 26.

Figure 2:
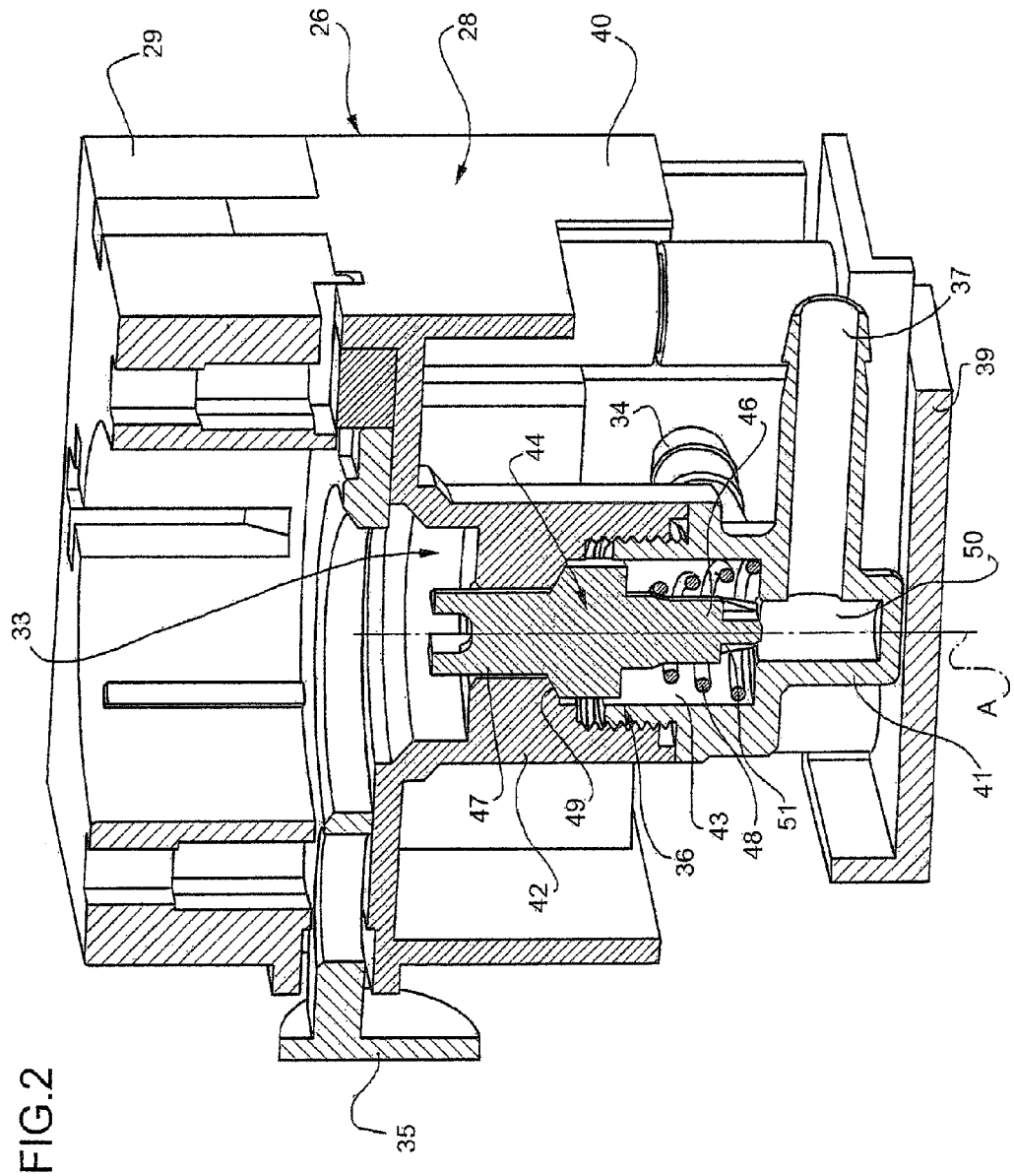
FIG. 2 is a partial section of a connecting component of FIG. 1 in a first operating position.

Advantageously, stem 46 and/or stem 47 have radial and/or axial recesses 51 configured at least to decrease the load losses when air flows in chamber 43 towards outlet duct 37. In particular, recesses 51 of stem 46 are closed in seat 50 when container assembly 3 is connected to connecting device 26 while recesses 51 of stem 47 are external to chamber 43 when the configuration is as indicated in FIG. 2.

The advantages of kit 1 disclosed and shown herein are the following.

The configuration of outlet duct 37 connected to valve 36 allows to automatically control the pressurised air flow with a single valve. Valve 36 is integrated in connecting device 26 and is relatively large and such as to more easily be produced and mounted. Connecting device 26 defines an integrated block to connect respectively container assembly 3 to housing 2 and to compressor assembly C both mechanically and fluidically. Furthermore, valve 36 is integrated in the connecting device so that the mounting may be carried out in parallel, i.e. connecting device 26 with valve 36 on one side, housing 2 and container assembly 3 on the other side.

The movement of shutter 44 is ensured by the coupling between stems 46, 47 and connecting device 26.

It is finally apparent that kit 1 disclosed and shown herein may be modified or varied without departing from the scope of protection as specified in the appended claims.

The invention claimed is:

1. A kit for repairing and inflating inflatable items comprising a housing (2), a compressor assembly (C) housed within said housing (2), a connecting device (26) having an inlet (34) connected to said compressor assembly (C) and a seat (33) adapted to be fluidically connected to a container assembly (3) for a sealing liquid and to said inlet (34), a valve (36) configured to be automatically opened when said container assembly (3) is connected to said connecting device (26) and elastically maintained in a first position such as to fluidically disconnect said inlet (34) from said seat (33) when said container assembly (3) is disconnected from said connecting device (26), and a flexible tube (38) fluidically connected to said compressor assembly (C), said kit being characterized in that said connecting device (26) comprises an outlet (37) fluidically connected to said valve (36) so as to be fluidically connected to said inlet (34) when said valve (36) is in said first position, and in that said flexible tube (38) is connected to said outlet (37).

2. The kit according to claim 1, characterized in that said connecting device (26) comprises a tubular body (42) at least partially defining said seat (33) and a fluidic portion (41) defining said inlet (34) and said outlet (37) connected to said tubular body (42).

3. The kit according to claim 2, characterized in that said valve (36) comprises a shutter (44) having a central body (45) arranged in abutment against said tubular body (42) when said valve is in said first position, and at least one stem (47) sliding in said connecting device (26).

4. The kit according to claim 3, characterized in that said stem (47) is adapted to cooperate with said container assembly (3), n that said shutter (44) comprises a second stem (46), and
in that said fluidic portion (41) defines a seat (50) fluidically interposed between said chamber (43) and said outlet (37) and housing at least one portion of said second stem (46) when said container assembly (3) is fluidically connected to said inlet (34).

5. The kit according to claim 3, characterized in that said tubular body (42) is configured to guide said at least one stem (47).

6. The kit according to claim 4, characterized in that said tubular body (42) is configured to guide said at least one stem (47) and in that said at least one stem (47), said second stem (46) and said seat (50) are configured so that said second stem (46) couples with and is guided by said seat (50) only once said shutter (44) has abandoned said first position when said container assembly is connected to said connecting device (26).

7. The kit according to claim 5, characterized in that said second stem (46) comprises radial recesses (51).

8. The kit according to claim 1, characterized by comprising a container assembly (3) for a sealing liquid, having an inlet port (23) connectable to said valve (36) and an outlet tube (27).

* * * * *